(12) United States Patent
Rouhana et al.

(10) Patent No.: US 7,625,048 B2
(45) Date of Patent: Dec. 1, 2009

(54) FOUR POINT SEAT BELT SYSTEM

(75) Inventors: Stephen William Rouhana, Plymouth, MI (US); Paul George Bedewi, Ashburn, VA (US); Dean M Jaradi, Macomb, MI (US); Kirsten Marie Carr, Ann Arbor, MI (US); John L. Sullivan, Ann Arbor, MI (US); Tiffani Michelle Natalini-Whitmore, Cathedral City, CA (US); Sundeep Venkat Kankanala, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/757,762

(22) Filed: Jun. 4, 2007

(65) Prior Publication Data

US 2008/0296884 A1 Dec. 4, 2008

(51) Int. Cl.
*B60R 22/00* (2006.01)
(52) U.S. Cl. .................................... 297/484
(58) Field of Classification Search ............... 297/484, 297/483, 297, 474; 280/808, 807
See application file for complete search history.

(56) References Cited

U.S. PATENT DOCUMENTS

| | | | | |
|---|---|---|---|---|
| 2,077,244 | A | * | 4/1937 | Le Roy ........................ 2/49.4 |
| 2,312,946 | A | * | 3/1943 | Watter ........................ 297/484 |
| 3,158,399 | A | * | 11/1964 | Pragnell ..................... 297/484 |
| 3,162,485 | A | * | 12/1964 | Pragnell ..................... 297/484 |
| 4,709,966 | A | * | 12/1987 | Parkinson et al. ........... 297/473 |
| 5,190,315 | A | | 3/1993 | Curto |
| 6,139,111 | A | | 10/2000 | Pywell et al. |
| 6,293,588 | B1 | | 9/2001 | Clune |
| 6,305,713 | B1 | | 10/2001 | Pywell et al. |
| 6,375,270 | B1 | | 4/2002 | Sullivan et al. |
| 6,705,641 | B2 | | 3/2004 | Schneider et al. |
| 6,769,716 | B2 | | 8/2004 | Rouhana et al. |
| 6,773,075 | B2 | | 8/2004 | Rouhana et al. |
| 6,811,186 | B1 | | 11/2004 | Fraley et al. |
| 6,869,105 | B2 | | 3/2005 | Cheng |
| 7,011,341 | B2 | | 3/2006 | Herberg et al. |
| 7,040,696 | B2 | | 5/2006 | Vits et al. |
| 7,364,199 | B2 | * | 4/2008 | Elizondo et al. ........ 280/801.1 |
| 2003/0034686 | A1 | * | 2/2003 | Soderstrom et al. ......... 297/484 |
| 2004/0119277 | A1 | | 6/2004 | Girardin |
| 2004/0251675 | A1 | | 12/2004 | Herberg et al. |
| 2005/0073187 | A1 | | 4/2005 | Frank et al. |
| 2005/0082815 | A1 | | 4/2005 | Frank et al. |
| 2005/0269861 | A1 | | 12/2005 | Vits et al. |

* cited by examiner

*Primary Examiner*—Milton Nelson, Jr.
(74) *Attorney, Agent, or Firm*—Shook, Hardy & Bacon LLP

(57) ABSTRACT

A four-point seat belt system for restraining a vehicle occupant in a vehicle seat is disclosed. Two shoulder belts are provided which are buckled together with a pair of lap belts. The convergence of the shoulder belts created at the buckles defines a V-shaped configuration which aids in occupant safety and comfort. Movably-adjustable retractors are provided to anchor the upper end of each shoulder belt to the vehicle seat. A movable headrest having a pair of laterally-adjustable belt loops is provided to further enhance occupant security and comfort.

10 Claims, 6 Drawing Sheets

FOUR POINT SEAT BELT SYSTEM

TECHNICAL FIELD

A seat belt system of a four-point arrangement is provided. Particularly, a four-point seat belt system is provided having a shoulder belt arrangement with adjustable retractors and guide loops to provide both security and comfort to the wearer-occupant.

BACKGROUND OF THE INVENTION

Automotive vehicles incorporate a variety of restraint systems to provide for the safety of vehicle occupants. For example, it is known in the vehicle art to provide various types of seat belts or restraint systems for restraining an occupant in his or her seat and providing controlled deceleration of portions of the body to limit the forces applied to the occupant's body during rapid deceleration of a vehicle from a cause such as a collision. Various types of seat belts and restraint systems have been used in automobiles, trucks, and other vehicles and are commonly known today.

Known seat belt systems typically used in commercially available production vehicles are three-point restraint systems with a lap belt and a shoulder belt extending over one shoulder of the occupant and connecting with the lap belt. The lap belts are anchored at one end, to the seat or to the vehicle adjacent the seat. The shoulder belts are connected at one end to the vehicle or to the seat and at the other end to the lap belt or lap belt buckle mechanism.

Four, five, and six-point restraint systems are among some of the seat belt and restraint systems that are particularly utilized in off-road type vehicles and other sport-type vehicles in order to provide additional restraint for occupants over two and three-point restraint systems. These seat belt systems tend to have multiple adjustable cinching mechanisms and are awkward and difficult to operate and properly position on an occupant. They also may be less comfortable and more complex due to the multiple mechanisms and therefore not amenable to quick donning and doffing on multiple occasions as may be required in a passenger vehicle.

Of particular interest to the automotive industry today is the four-point seat belt restraint system. Some of the four-point seat belt systems currently envisioned are essentially parallel shoulder belts. While providing a certain degree of protection, the systems currently envisioned may cause the seat occupant discomfort as a consequence of the shoulder belts contacting the neck during belt use. In addition, this discomfort may well be exacerbated if the lateral spacing of the shoulder belt is small. For example, if the lateral spacing of the shoulder belt is 130 mm along an occupant's clavicles, discomfort may result, since the belts may contact the occupant's neck area. As a consequence use of the four-point seat belts might be less than that of three-point belts negating the expected improvement in performance in society as a whole.

A further difficulty created by four-point seat belt restraint systems that use parallel shoulder belts is that the belts will fit differently on different sized occupants. For example, the belts may be too wide for smaller occupants and may be too narrow for larger occupants depending on the centerline-to-centerline spacing. This could affect the ability to maintain the position of the seat belts on the shoulders of the occupants during normal vehicle operation as well as during an impact event.

Other difficulties with known four-point seat belt restraint systems relate to the buckling systems. Specifically, the buckle-tongue arrangement of some four-point seat belt systems, in which the left hand shoulder belt and lap belt are connected to the buckle (or to the tongue) and the right hand shoulder belt and lap belt are connected to the tongue (or to the buckle), may have the tendency to "ride up" or move in an upward direction, that is, away from the occupant's lap during normal vehicle operation. The effect of this "ride up" could result in pre-submarining of the occupant, thus possibly leading to submarining of the occupant in an impact event.

Accordingly, a need exists today for an improved four-point seat belt system for use in vehicles that provides proper and constant belt alignment during normal vehicle operation as well as during an impact event. Such a system must be comfortable to the wearer. In addition, a need also exists for a four-point seat belt restraint system that prevents pre-submarining by restricting the movement of the lap-belt portion of the belt system from the pelvis to the abdomen during an impact event.

SUMMARY OF THE INVENTION

The disclosed embodiments of the invention provide a four-point seat belt restraint system mounted on a vehicle seat which maintains proper belt alignment and routing for the four-point system during normal use and during impact events as well as properly reducing and distributing forces applied to the body of the occupant during rapid deceleration conditions. In the preferred embodiment the four-point seat belt restraint system includes a pair of shoulder belts which wrap around the upper portion of the vehicle seat. Each of the pair of shoulder belts converges at a seat belt buckle assembly thereby defining a V-shape. The shoulder belts are anchored to the seat, for example, by a single retractor having a dual spool or by a pair of retractors which may be relocated to adjust for both occupant size and occupant comfort. The shoulder belts are anchored on the seat so that they cross one another. As an alternative to anchoring the shoulder belts to the seat the shoulder belts could be mounted to the vehicle. Both arrangements assist in maintaining the V-shape configuration of the shoulder belts.

A vertically-movable headrest having a pair of spaced-apart horizontally-movable seat belt loops is optionally provided. Vertical movement of the headrest and horizontal movement of the seat belt loops enhance the ability of the described four-point seat belt restraint system to allow and improved and more comfortable fit for a great variety of occupants having different builds.

A pair of lap belts is provided. Each of the lap belts is anchored to the underside of the seat by a retractor. A lap belt loop may be provided for each of the lap belts which may be manually or automatically adjusted vertically. Vertical adjustment of the lap belt loops also enhances the suitability of the four-point seat belt restraint system for a variety of different occupants. Both shoulder belt and lap belt tension may be adjusted as desired.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
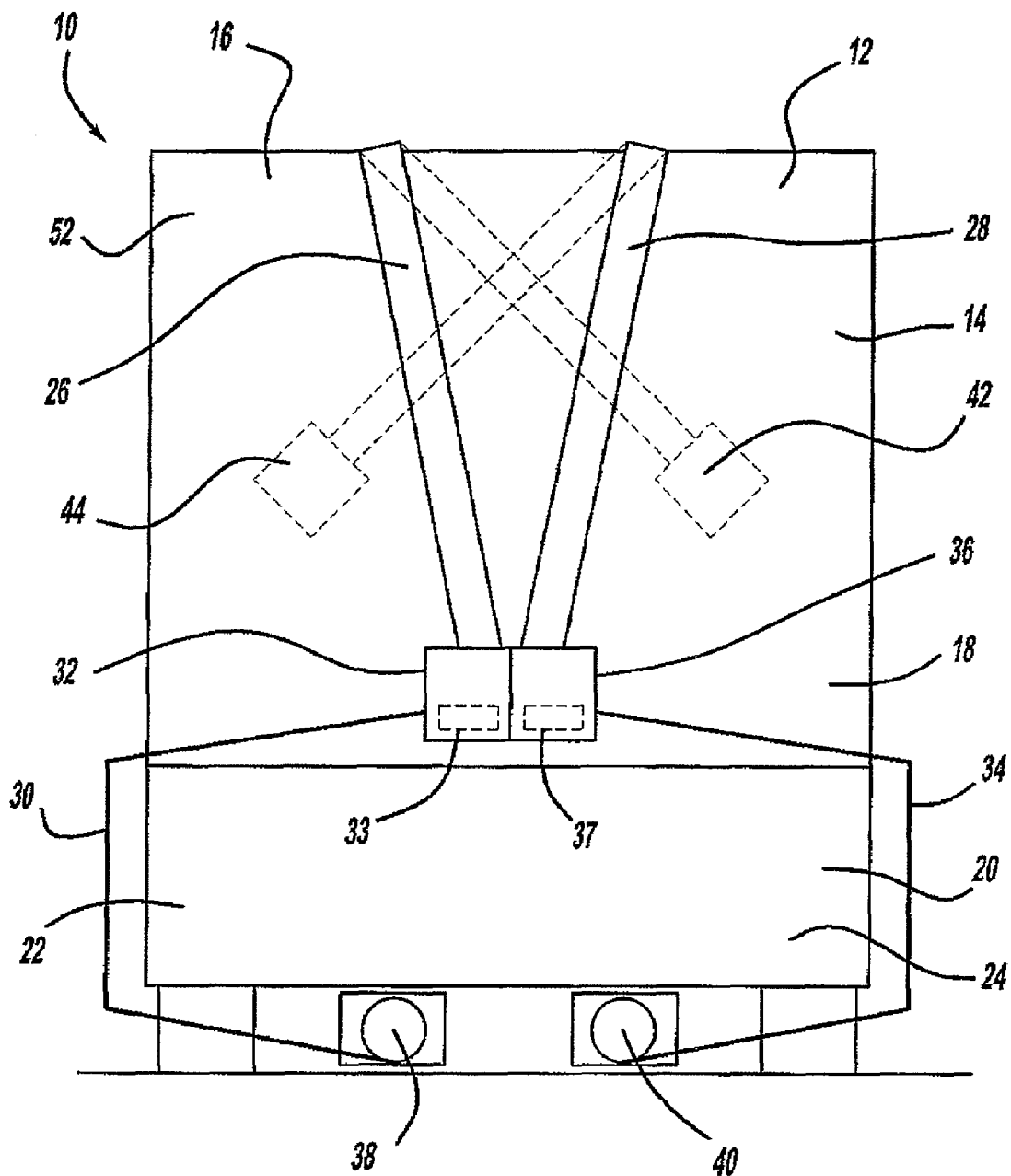
FIG. 1 illustrates a front view of a four-point seat belt restraint system in a non-use position according to a first embodiment of the invention.

In the following figures, the same reference numerals will be used to refer to the same components. In the following description, various operating parameters and components are described for one constructed embodiment. These specific parameters and components are included as examples and are not meant to be limiting.

Referring to the drawings and in particular to FIG. 1, one embodiment of a four-point seat belt restraint system, generally illustrated as 10, is shown. A seat 12, typically for use in an automotive vehicle (not shown), includes a generally upright seat back 14 extending between a top portion 16 and a bottom portion 18 for supporting the back of a seated occupant. The seat 12 further includes a generally horizontal seat cushion 20 projecting forwardly from the bottom portion 18 of the seat back 14 and extending between an inboard or right side 22 and an outboard or left side 24 for supporting the bottom of the seated occupant. The inboard side 22 is further defined by the side of the seat 12 adjacent the inboard or middle of the vehicle and the outboard side 24 is further defined by the side of the seat 12 adjacent the outboard or outside of the vehicle as is commonly known in the art.

The four-point seat belt restraint system 10 includes a first, or inboard shoulder belt webbing 26 extending from the top portion 16 to the bottom portion 18 of the seat back 14 adjacent the inboard side 22 of the seat cushion 20. The four-point seat restraint system 10 further includes a second, or outboard, shoulder belt webbing 28 extending from the top portion 16 to the bottom portion 18 of the seat back 14 adjacent the outboard side 24 of the seat cushion 20. The four-point seat belt restraint system 10 further includes a first, or inboard, lap belt webbing 30 extending from the inboard side 22 of the seat cushion 20 to a buckle (tongue) component 32 and a second, or outboard, lap belt webbing 34 extending from the outboard side 24 of the seat cushion 20 to a tongue (buckle) component 36. It is to be understood that the component 32 can be either a buckle or a tongue and the component 36 can be either a tongue or a buckle. References made to these elements are made with this interchangeability in mind.

It is preferred that a downward force be applied to the first shoulder belt webbing 26 and to the second shoulder belt webbing 28. Such a force helps to maintain the buckle/tongue as low on the occupant as possible to minimize submarining. Belt webbing tension is in part a function of the weight of the components 32 and 36 (in addition to the retractor force exerted by the shoulder belt retractors 44 and 42 and by the lap belt retractors 38 and 40). The lower the buckle rides on the occupant, the greater the tension applied to the shoulder belt 26 and the shoulder belt 28. Accordingly, a lower position of the components 32 and 36 may be achieved by the optional addition of weights. Specifically, a weight 33 may be added to the buckle (tongue) component 32 and a weight 37 may be added to the tongue (buckle) component 36. The weights 33 and 37 may be composed of any of a variety of materials including, for example, a metal such as lead or a high density polymer. The weights 33 and 36 may be disposed internally with respect to the components 32 and 36 or may be fitted externally. Furthermore, the weights 33 and 36 may be interchangeable with greater or lesser weights depending on the requirements of the occupant.

The first lap belt webbing 30 is anchored to the seat 12 by a retractor 38. The retractor 38 is anchored to the seat by fasteners including bolts, welds and the like. The second lap belt webbing 34 is anchored to the seat 12 by a retractor 40, also attached to the seat 12 by the mentioned fasteners. The retractors 38 and 40 are fixed to the seat 12. Fixation may be achieved in a variety of ways. One method of fixation is illustrated whereby the retractors 38 and 40 are positioned substantially under the seat 12. The location of the lap belt retractors 38 and 40 under the seat makes packaging of the retractors easier and more economical, particularly in vehicles where seat-to-tunnel or seat-to-door spacing is restricted. As an alternative the retractors 38 and 40 may be attached to the sides of the seat (not shown).

While two retractors 38 and 40 are illustrated it is to be understood that a single retractor may be used in lieu of the shown and discussed pair. Conversely, the retractors 38 and 40 may be substituted for by a rigid, fixed anchor as is known in the art. The retractors 38 and 40 may be of a variety of types, including mechanical, mechanical with electric lock-up, electromagnetic, and others. An electric retractor is valuable in that it offers a selected tension (either constant or varying) to be imposed on the lap belts 30 and 34 to aid in maintaining the components 32 and 36 as low on the occupant's lap as possible. In addition, a high lap belt tension also resists lateral motion of the lap belts 30 and 34, thereby assisting in maintaining the buckle-tongue interface of the components 32 and 36 as close to the centerline of the occupant as is possible. This arrangement offers an improvement over known restraint systems using conventional mechanical retractors. The retractors 38 and 40 are also equipped with dynamic pretensioners (of the pyrotechnic type or of another design). The retractors 38 and 40 also may be equipped with static pretensioning.

The first shoulder belt webbing 26 may be fixed or may be releasably attachable to the buckle (tongue) component 32 and the second shoulder belt webbing 28 is releasably attachable to the tongue (buckle) component 36. The buckle (tongue) component 32 may be fixed or may be releasably attachable to the tongue (buckle) component 36. (By allowing for the possibility of releasable attachment of the belt webbing to the buckle component ease of both assembly and service is enhanced.) This arrangement results in the illustrated V-shape defined by the substantial convergence of the first shoulder belt webbing 26 and the second shoulder belt webbing 28 at the components 32 and 36. The first shoulder belt webbing 26 and the second shoulder belt webbing 28 have a large lateral spacing as illustrated from the occupant's neck (not shown) while still providing effective support by the convergence along the centerline of the occupant at the area of the components 32 and 36. This increased lateral spacing at the upper part of the seat 12 increases occupant comfort for occupants of different sizes, including smaller occupants having smaller necks, narrower shoulders and shorter upper torso eights. This geometry also aids in keeping seat belts on the occupant's shoulders at all times, while lowering the risk of soft tissue neck injury and enhancing comfort for wide range of occupant builds.

It is to be understood that the buckle arrangement illustrated in FIG. 1 may be altered so that, for example, the buckle component is provided on the shoulder webbing. The configuration shown is intended as being illustrative and not limiting.

The first shoulder belt webbing 26 is anchored to the seat 12 by a retractor 42 that is fixedly secured to the seat 12 by fasteners including bolts, welds and the like. The second shoulder belt webbing 28 is anchored to the seat 12 by a retractor 44 which is also fixedly secured to the seat 12 by the noted fasteners. The retractors 42 and 44 are preferably but not necessarily equipped with load-limiting features which may be of the single or multiple level and discrete or continuous type as is known in the art. Load limiting offers the advantages of enhancing control of the occupant's upper torso kinematics, and limiting the tension load applied by the shoulder belt to the lapbelt, approximately limiting the load transferred by the restraint system to the upper torso, thus helping to minimize submarining in an impact event. The dynamic and static load pretensioners described above with respect to the retractors 38 and 40 combines with this load limiting feature to assist in minimizing submarining. Pre-impact tensioning is useful in reducing slack prior to an impact which in turn may improve occupant coupling to the seat and to the restraint system.

As illustrated in FIG. 1, the retractor 42 is positioned on the seat back at a location that is on the side opposite that of the first shoulder belt webbing 26. The retractor 44 is also positioned on the seat back at a location that is on the side opposite that of the second shoulder belt webbing 28. This arrangement defines a crossed pattern that allows for the desired belt orientation and belt angles relative to the occupant's shoulder and was determined from testing with human volunteers to improve comfort. The first shoulder belt webbing 26 and the second shoulder belt webbing 28 follow over the top of the seat 12 and provide a change of direction without twisting or folding at the top of the seat back. This arrangement also provides for enhanced occupant comfort and performance in that the first shoulder belt webbing 26 and the second shoulder belt webbing 28 are able to lie more naturally on the curve of the occupant's shoulder.

Figure 2:
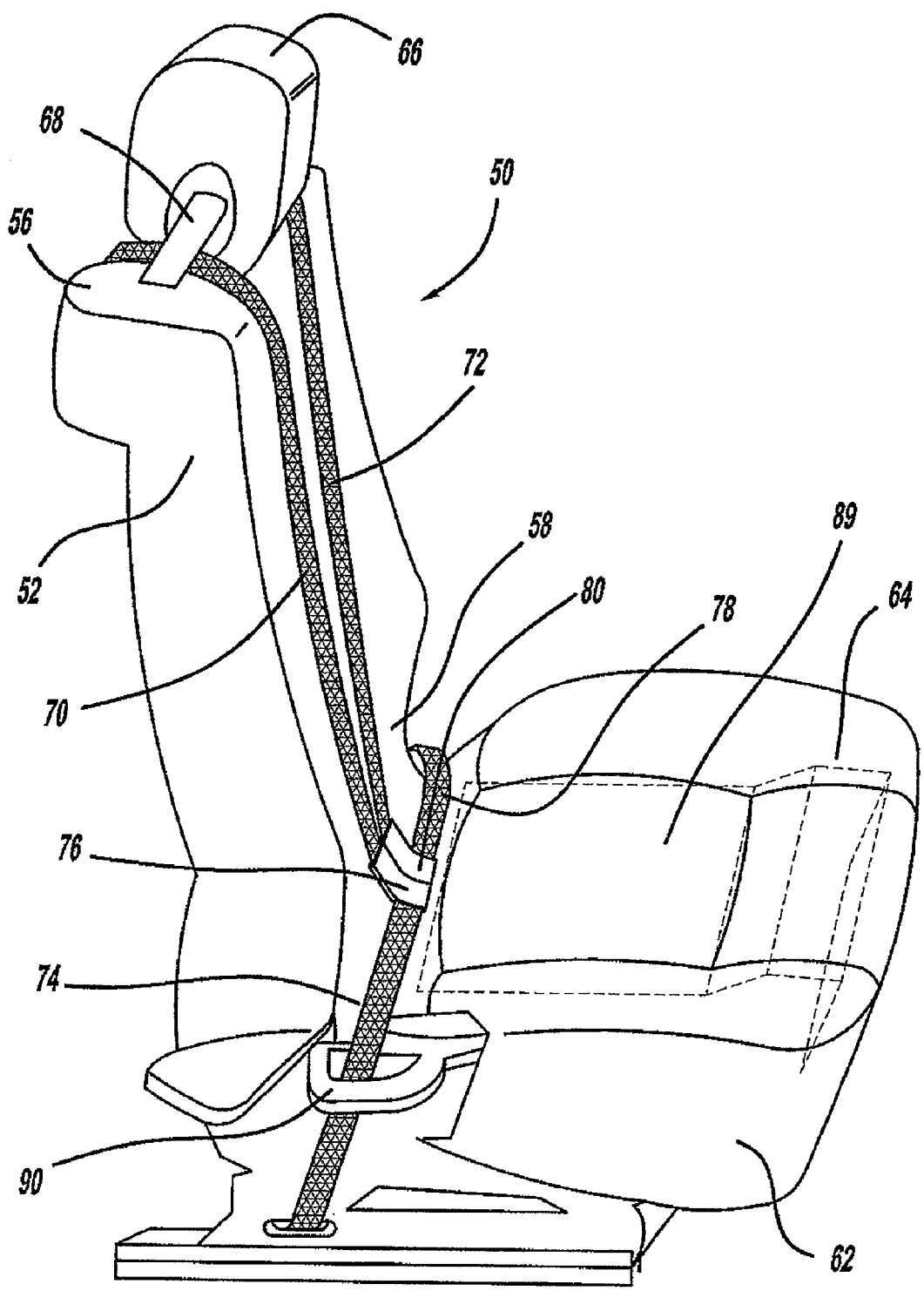
FIG. 2 illustrates a perspective view of a vehicle seat incorporating the four-point seat belt restraint system in a non-use position according to a second embodiment of the invention.
Figure 3:
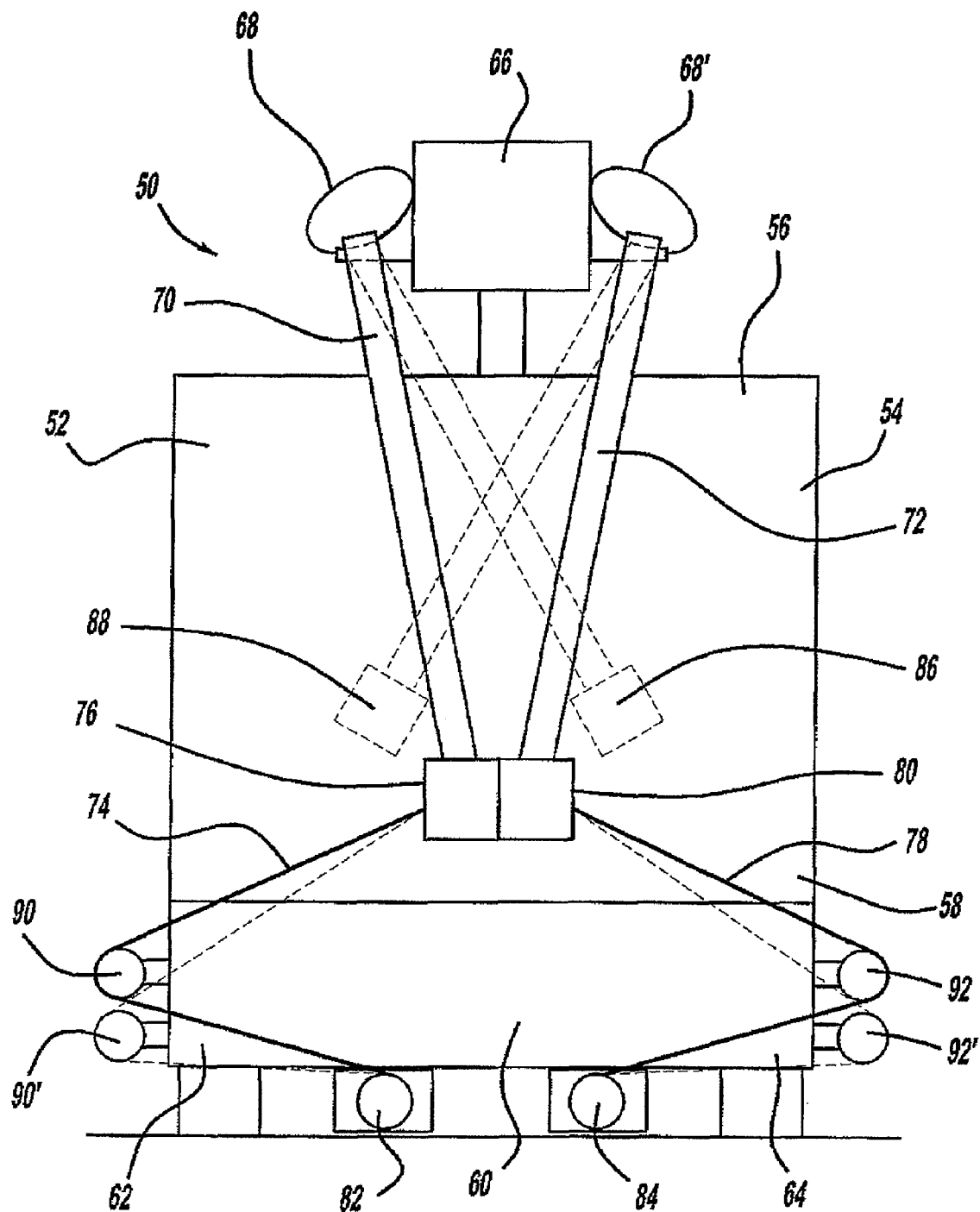
FIG. 3 illustrates a front view of the second embodiment of the four-point seat belt restraint system shown in FIG. 2 illustrating the headrest in its raised position and the headrest seat belt loops in their retracted positions.
Figure 4:
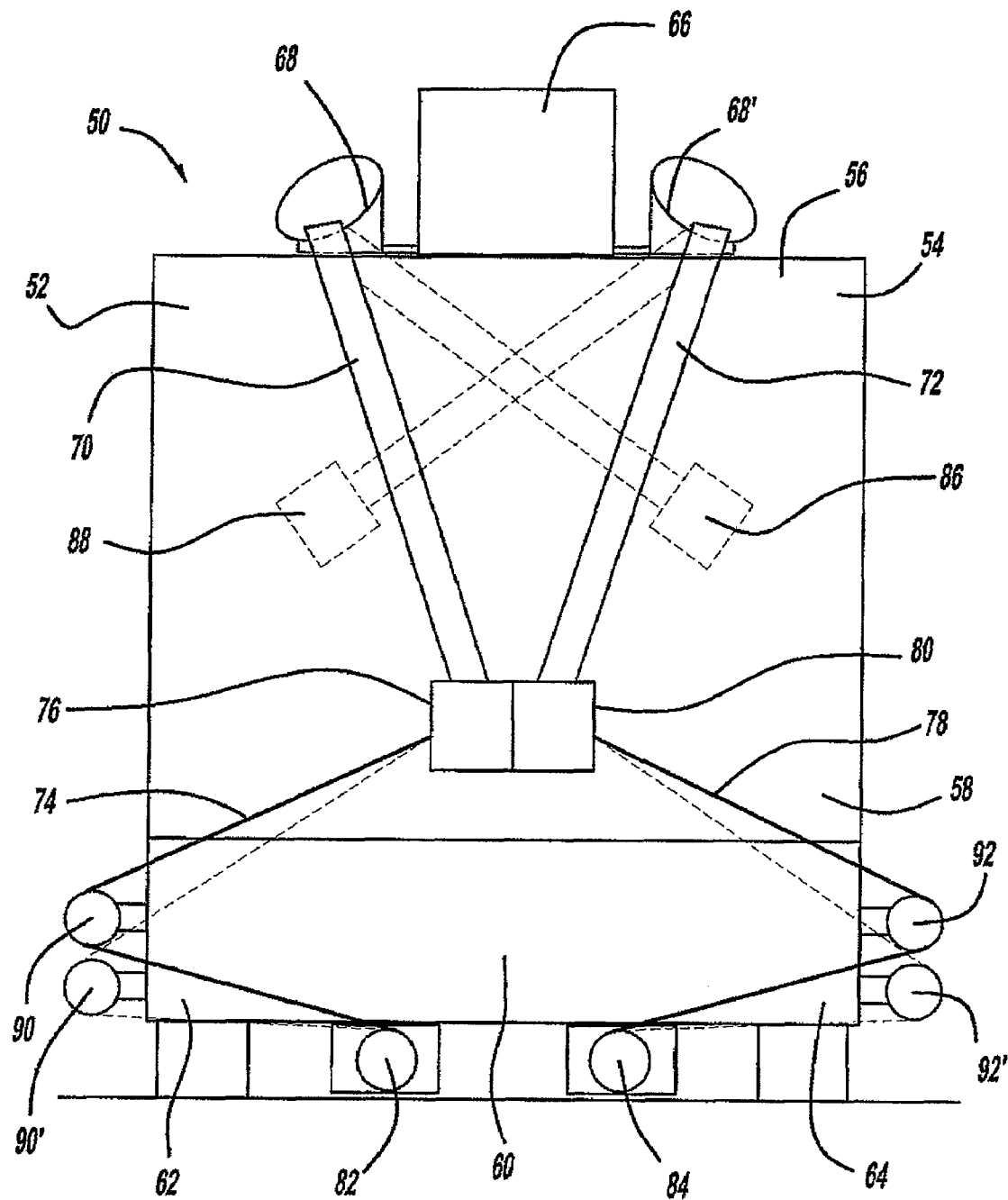
FIG. 4 illustrates the same view as FIG. 3 but shows the headrest in its lowered position and the headrest seat belt loops in their extended positions.

An alternate embodiment of the four-point seat belt restraint system of the present invention is illustrated in FIGS. 2 through 4 and is generally illustrated as 50. A seat 52 is shown and includes a generally upright seat back 54 extending between a top portion 56 and a bottom portion 58 for supporting the occupant's back. The seat 52 further includes a generally horizontal seat cushion 60 projecting forward from the bottom portion 58 of the seat back 54. The seat cushion 60 extends between an inboard or right side 62 and an outboard or left side 64 for supporting the seated occupant. The inboard side 62 is further defined by the side of the seat 52 adjacent the inboard or middle of the vehicle and the outboard side 64 is further defined by the side of the seat 52 adjacent the outboard or outside of the vehicle.

A movable headrest 66 is attached to the area of the top portion 56 of the upper seat back 54 in a known manner. The headrest 66 is movable between a raised position illustrated in FIG. 3 and a lowered position illustrated in FIGS. 2 and 4. The headrest 66 includes a pair of lateral seat belt loops 68 and 68'. Each of the loops 68 and 68' is movable between an outboard position and an inboard position. The inboard position is illustrated in FIG. 3 while the outboard position is illustrated in FIGS. 2 and 4. It should be noted that while the configuration of the seat belt loops 68 and 68' are shown as being loops that surround the shoulder belts 70 and 72, other configurations of belt retainers may be used such as substantially horizontal flanges.

The loops 68 and 68' retain the shoulder belts 70 and 72 in a spaced apart configuration with respect to the body of the seat occupant. By achieving a certain separation between shoulder belts 70 and 72 the comfort of the occupant is optimized. Ideally the shoulder belts 70 and 72 are spaced such that they are positioned over the clavicles of the adult occupant (not shown). This spacing may vary, but ideally is between about 180 mm and about 208 mm from the centerline of the shoulder belt 70 to the centerline of the shoulder belt 72 at about the height of the front edge of the clavicle of a mid-sized male occupant. The spacing of the shoulder belts 70 and 72 is symmetrical about the centerline of the occupant.

As set forth above in FIG. 1 and as described in conjunction therewith in relation to the four-point seat belt restraint system 10, the four-point seat belt restraint system 50 shown in FIGS. 2 through 4 includes a first, or inboard shoulder belt webbing 70 extending from the top portion 56 of the seat back 54 to the bottom portion 58. A second, or outboard shoulder belt webbing 72 is also provided and similarly extends from the top portion 56 of the seat back 54 to the bottom portion 58 of the seat back 54.

The four-point seat belt restraint system 50 further includes a first, or inboard, lap belt webbing 74 extending from the inboard side 62 to a buckle (tongue) component 76. The system 50 further includes a second, or inboard, lap belt webbing 78 extending from the outboard side 64 of the seat cushion 60 to a tongue (buckle) component 80. The first lap belt webbing 74 is anchored to the seat 52 by a retractor 82. The retractor 82 is anchored to the seat 52 by fasteners as previously described. The second lap belt webbing 78 is similarly anchored to the seat 52. The retractors 82 and 84 are similar in form and function to the retractors 38 and 40 mentioned above and described with respect to FIG. 1, including all of the listed possible variations useful in adjusting belt tension.

The retractors 82 and 84 are disposed beneath the seat cushion 60. This positioning provides the lap belt webbings 74 and 78 with an anchoring position that is substantially forward of the seat back 52. Positioned in this manner the lap belt webbings 74 and 78 also provide a more comfortable arrangement for the occupant/wearer.

The buckle (tongue) component 76 is releasably attachable to the tongue (buckle) component 80. The first shoulder belt webbing 70 may be releasably attached to the components 76 and 80 and the second shoulder belt webbing 72 may be releasably attached to the components 76 and 80. A "V" configuration defined by the first shoulder belt webbing 70 and the second shoulder belt webbing 72 is formed by convergence of the webbings 70 and 72 at the components 76 and 80. The lateral spacing provided by this configuration and all of the benefits achieved thereby are the same as that discussed above with the four-point seat belt restraint system 10 discussed above.

The headrest 66 may be raised to a position illustrated in FIG. 3 or may be lowered to a position illustrated in FIG. 4. In addition, the lateral seat belt loops 68 and 68' may be adjusted horizontally between the inboard position illustrated in FIG. 3 and the outboard position illustrated in FIGS. 2 and 4. Vertical adjustment of the headrest 66 (or, as an alternative, load-bearing posts mounted on the seat back [not shown]) allows for vertical adjustment of the lateral seat belt loops 68 and 68'. The adjustment of both the headrest 66 and its associated lateral seat belt loops 68 and 68' may be automatically made (as by mechanical, magnetic or electrical movement) or may be made manually, as an alternative or in combination with the automatic adjustment feature. By horizontal movement of the lateral seat belt loops 68 and 68' with respect to the headrest and upon vertical movement of the headrest 66, the preferred lateral spacing of the shoulder belts 70 and 72 can be achieved for occupants having different sizes, particularly for occupants having differently-sized torsos. The occupant is thus provided with added comfort and has the added benefit of benefiting from improved seat belt system performance in both normal driving conditions and during an impact event.

The first shoulder belt webbing 70 is anchored to the seat by a retractor 86 that is movably secured to the seat 52 by fasteners described above. The second shoulder belt webbing 72 is fixedly secured to the seat 52 by a retractor 88 that is movably secured to the vehicle seat 52 by fasteners. The retractors 86 and 88 are shown in their first, lower position in FIG. 3 and have been relocated to their second, higher position in FIG. 4. While two positions are illustrated it is to be understood that a range of positions may be possible utilizing the appropriate connectors. Movement of the retractors 86 and 88 between positions provides the occupant with different shoulder belt arrangements as dictated by the occupant's size and shape. This arrangement also helps to prevent twisting or folding of the belts.

The seat restraint system 10 is designed to control occupant motion and reduce force levels on the occupant's chest. During a crash event the system 10 allows the occupant's torso to reach the vertical position or forward of vertical at the time of peak belt forces. The pretensioning of the retractors 38 and 40 by pyrotechnical, electrical, mechanical, or other means ensures contact of the lap belts 30 and 34 with the pelvis during the crash loading. As shown in FIG. 2, a seat ramp 89, also included in the seat restraint system 10, further minimizes the horizontal travel and vertical drop of the occupant's pelvis. The seat ramp 89 may be of various type, style, material, and shape as known in the art. The seat ramp 89 is commonly made from sheet metal and may be deformable during a collision. The seat-ramp 89 is most commonly located beneath seat cushion padding as illustrated in FIG. 2, under the occupant's pelvis and thigh region. The seat ramp 89 is angled with the front portion higher vertically than the rear portion, so as to prevent the forward horizontal travel of an occupant during a forward collision. In order for an occupant to travel in a forward direction the occupant would need to slide up the seat ramp 89 against the force of gravity, rather than for example a flat seat, which would have less resistance. Also, for a similar reason the seat ramp 89 in having an inclined shape, during a forward collision, when an occupant tends to move forward in the direction of the collision, the shape and material of the seat ramp 89 resists the ability for the occupant's pelvis to drop vertically. The combination of the above-described system components, when properly coupled, prevents the possibility of the shoulder belts 26 and 28 from pulling the lap belts 30 and 34 off of the pelvis during a crash, resulting in one form of "submarining" whereby the occupant's pelvis slides under the lap belt.

To increase the adaptability of the four-point seat belt restraint system 50 to a variety of differently-sized occupants, a vertically adjustable lap belt loop 90 is provided to restrict side-to-side movement of the first lap belt webbing 74. For the same reason a vertically adjustable lap belt loop 92 is provided to restrict side-to-side movement of the second lap belt webbing 78. As illustrated in FIGS. 3 and 4, the vertically adjustable lap belt loop 90 and the vertically adjustable lap belt loop 92 can be moved from raised positions to lowered positions, the latter positions being illustrated by vertically adjustable lap belt loop 90' and vertically adjustable lap belt loop 92' with the lap belt webbing being shown in broken lines. This vertical adjustment functions to allow a change in the angle of the lap belt webbings 74 and 78 and hence alter the vertical component of the static lap belt force to due the lap belt retractors 82 and 84, respectively. As noted above, static belt tension assists in keeping the lap belt webbings 74 and 78 on the occupant's lap. Movement of the adjustable lap belt loops 90 and 92 to their lowered positions illustrated in broken lines translates to a larger vertical component of the static belt force, resulting in increased resistance to the ride up of the components 76 and 80. Conversely, movement of the adjustable lap belt loops 90 and 92 to their upper positions translates to a smaller vertical component, thus enhancing occupant comfort. Vertical adjustment of the adjustable lap belt loops 90 and 92 may be made either manually or automatically.

The angle of the lap belt webbings 74 and 78 is preferably substantially between about 0° and 32° from vertical and is more preferably about 16° from vertical in a side view such as that shown in FIG. 2. Selection of the angle depends on the balance of the downward force on the components 76 and 80 with the necessary restraining force. Also considered is the balance between the downward force of the lap belts 74 and 78 against the upward force on the shoulder belts 70 and 72.

Figure 5:
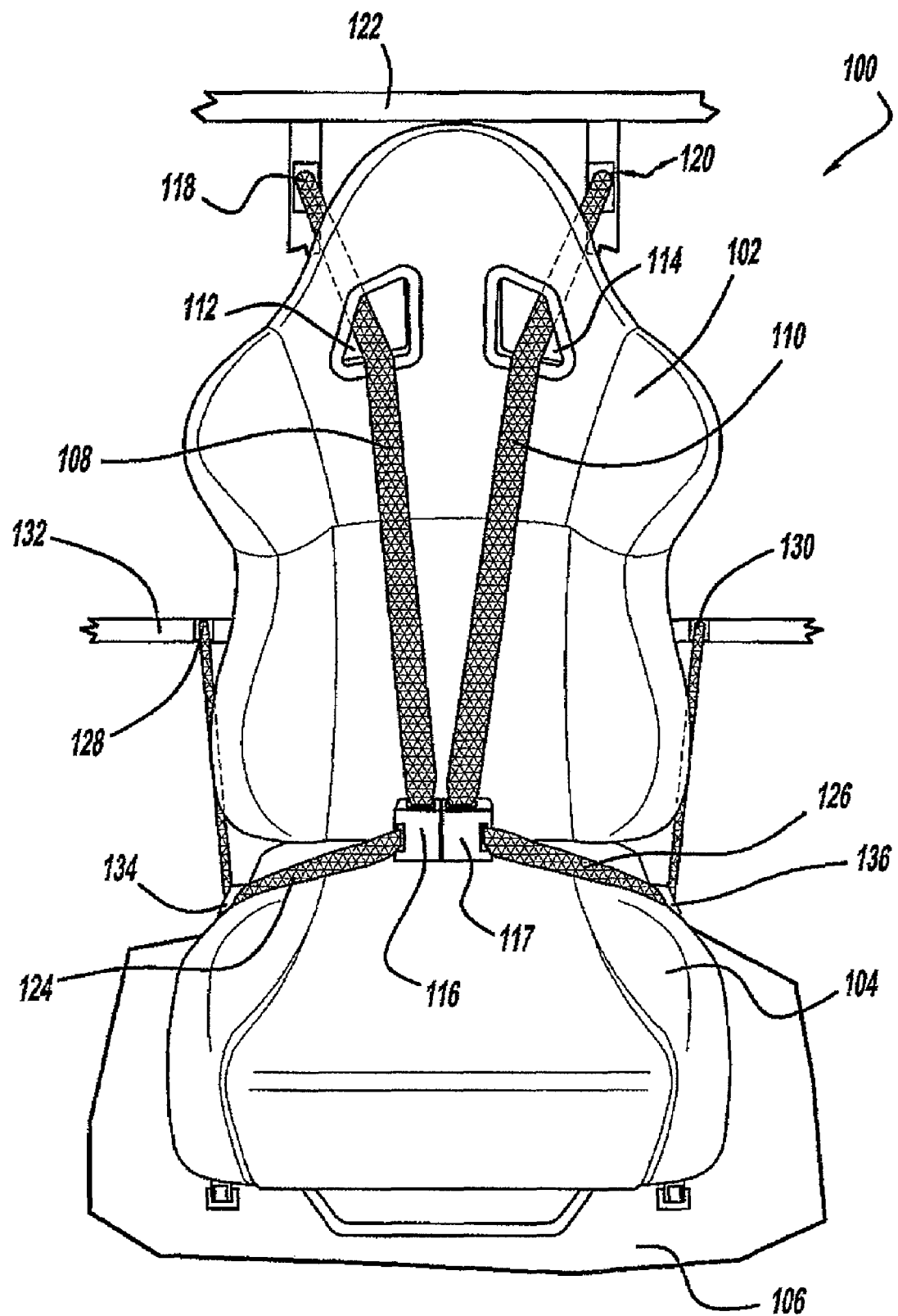
FIG. 5 illustrates a front view of an alternate embodiment of the present invention.

The seat belt and retractor configurations discussed above relate to one preferred embodiment of the present invention in which the seat belt retractors are fitted to the seat itself. An alternate arrangement is shown in FIG. 5 in which the seat belt retractors are mounted instead to an area of the vehicle interior adjacent to the seat.

Particularly, a vehicle seat assembly, generally illustrated as 100, is shown in which a vehicle seat includes a vehicle seat back 102 and a vehicle seat base 104. The vehicle seat base 104 is fixed (or is movably attached) to a vehicle floor pan 106 in a conventional manner.

A pair of shoulder belts 108 and 110 is provided. The shoulder belt 108 extends through an aperture 112 formed in the vehicle seat back 102. The shoulder belt 110 extends through an aperture 114 also formed in the vehicle seat back 102. The apertures 112 and 114 maintain the shoulder belts 108 and 110 in the preferred configuration set forth above with respect to the embodiment shown in FIGS. 2 through 4.

One end of the shoulder belt 108 is attached to a buckle (tongue) component 116. The other end of the shoulder belt 108 is attached to a shoulder belt retractor 118. One end of the shoulder belt 110 is attached to a tongue (buckle) component 117. The other end of the shoulder belt 110 is attached to a shoulder belt retractor 120. It is to be understood that the component 116 can be either a buckle or a tongue and the component 117 can be either a tongue or a buckle. References made to these elements are made with this interchangeability in mind. The shoulder belt retractors 118 and 120 are fixedly attached to the vehicle interior such as on vehicle interior cross-member 122.

A pair of lap belt webbings 124 and 126 is provided in relation to the vehicle seat base 104. One end of the lap belt webbing 124 is attached to the buckle (tongue) component 116. The other end of the lap belt webbing 124 is attached to a lap belt webbing retractor 128. Similarly, one end of the lap belt webbing 126 is attached to the tongue (buckle) component 117. The other end of the lap belt webbing 126 is attached to a lap belt webbing retractor 130. The lap belt webbing retractors 128 and 130 are fixedly attached to the vehicle interior such as on vehicle interior cross-member 132. To maintain the lap belt webbing 124 in its proper position relative to the vehicle seat base 104 a guide loop 134 is provided and is preferably attached to the vehicle seat base 104. In addition, to maintain the lap belt webbing 126 in its proper position relative to the vehicle seat base 104 a guide loop 136 is provided and is preferably attached to the vehicle seat base 104. Both of the guide loops 134 and 136 may be adjustable (for example, vertically) as set forth above with respect to the embodiment illustrated in FIG. 3.

Figure 6:
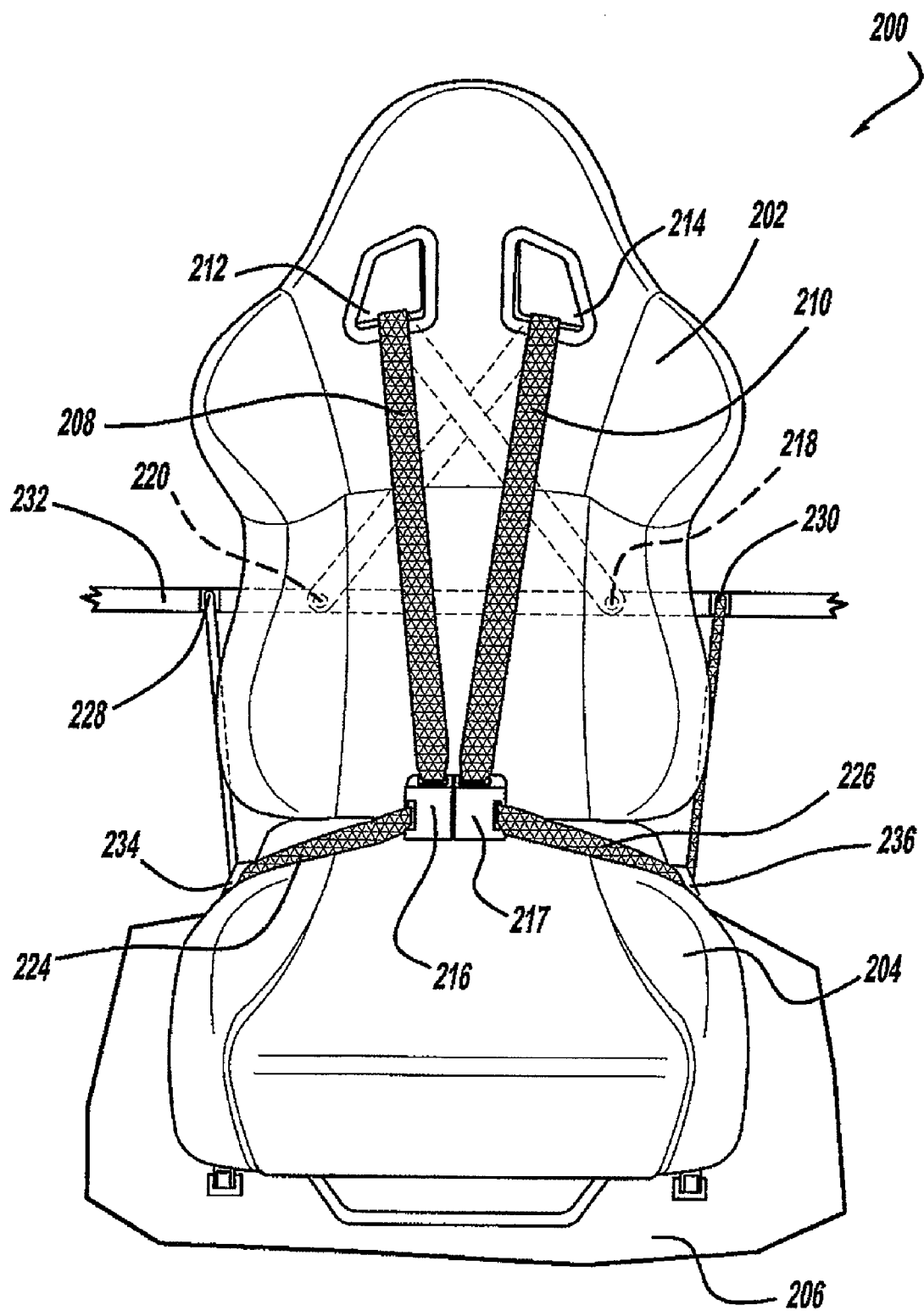
FIG. 6 illustrates a front view of another alternate embodiment of the present invention.

An alternative arrangement for attachment of the seat belt retractors to an area of the vehicle other than the seat shown in FIG. 5 is illustrated in FIG. 6. With reference to FIG. 6, a vehicle seat assembly, generally illustrated as 200, is shown in which a vehicle seat includes a vehicle seat back 202 and a vehicle seat base 204. The vehicle seat base 204 is fixed (or is movably attached) to a vehicle floor pan 206.

A first shoulder belt 208 and a second shoulder belt 210 are provided. The first shoulder belt 208 extends through an aperture 212 formed in the vehicle seat back 202. The second shoulder belt 210 extends through an aperture 214 also formed in the vehicle seat back 202. Like the apertures 112 and 114 shown in FIG. 5 and discussed in relation thereto, the apertures 212 and 214 maintain the shoulder belts 208 and 210 in the preferred configuration v-shape discussed above.

One end of the first shoulder belt 208 is attached to a buckle (tongue) component 216. The other end of the first shoulder belt 208 is attached to a first shoulder belt retractor 218. One end of the second shoulder belt 210 is attached to a tongue (buckle) component 217. The other end of the second shoulder belt 210 is attached to a second shoulder belt retractor 220. The component 216 can be either a buckle or a tongue and the component 217 can be either a tongue or a buckle.

The first shoulder belt retractor 218 and the second shoulder belt retractor 220 are fixedly attached to the vehicle interior such as on vehicle interior cross-member 232. As illustrated, the first shoulder belt retractor 218 is fitted to the interior cross-member 232 at a point opposite the aperture 212 and the second shoulder belt retractor 220 is fitted to the interior cross-member 232 at a point opposite the aperture 214. Thus positioned a criss-cross arrangement of the first shoulder belt 208 and the second shoulder belt 210 is defined on the back side of the vehicle seat back 202.

A pair of lap belt webbings 224 and 226 is provided. One end of the lap belt webbing 224 is attached to the buckle (tongue) component 216. The other end of the lap belt webbing 224 is attached to a lap belt webbing retractor 228. One end of the lap belt webbing 226 is attached to the tongue (buckle) component 217. The other end of the lap belt webbing 226 is attached to a lap belt webbing retractor 230. The lap belt webbing retractors 228 and 230 are fixedly attached to the vehicle interior cross-member 232. A guide loop 234 is provided and is preferably (but not exclusively) attached to the vehicle seat base 204 to maintain the lap belt webbing 224 in its preferred position. Similarly, a guide loop 236 is also attached to the vehicle seat base 204 to maintain the lap belt webbing 226 in its preferred position. Both of the guide loops 234 and 236 may be adjustable in for example, the vertical direction.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A vehicle occupant restraint system comprising:
    a seat having a seat back and a seat cushion, said seat back having a front, a top side, a left half, a right half, and a back side, said seat cushion having an underside;
    a first shoulder belt having a retractor end and a buckle end, said first shoulder belt for extending over the left shoulder of a seated occupant along said left half of said front of said seat back;
    a second shoulder belt having a retractor end and a buckle end, said second shoulder belt for extending over the right shoulder of a seated occupant along said right half of said front of said seat back;
    a first shoulder belt anchor being positioned on said right half of said back side of said seatback, said retractor end of said first shoulder belt being connected to said first shoulder belt anchor;
    a second shoulder belt anchor being positioned on said left half of said back side of said seatback, said retractor end of said second shoulder belt being connected to said second shoulder belt anchor, whereby a portion of said first shoulder belt crosses a portion of said second shoulder belt on said back side of said seatback;
    a first lap belt having an anchor end;
    a first lap belt anchor positioned at least partially beneath said seat cushion, said anchor end of said first lap belt being connected to said first lap belt anchor;
    a second lap belt having an anchor end;
    a second lap belt anchor positioned at least partially beneath said seat cushion, said anchor end of said second lap belt being connected to said second lap belt anchor; and
    a buckle and latch assembly to which one or both of said first shoulder belt and said second shoulder belt may be attached, said first shoulder belt and said second shoulder belt defining a V-shaped configuration when said first shoulder belt and said second shoulder belt are attached to said buckle and latch assembly.

2. The vehicle occupant restraint system of claim 1 wherein said seat cushion includes a left side, a right side, and an underside.

3. A vehicle occupant restraint system for a vehicle having a forward end, the vehicle occupant restraint system comprising:
    a seat having a seat back and a seat cushion, said seat back having a front, a top side, a left half, a right half, and a back side;
    a left shoulder belt anchored to a point on said right half of said back side of said seat back for extending over the left shoulder of a seated occupant along said left half of said front of said seat back;
    a right shoulder belt anchored to a point on said left half of said back side of said seat back for extending over the right shoulder of a seated occupant along said right half of said seat back;
    a first lap belt having an anchor end, said first lap belt having an angle from vertical of between about 0° and 32°;
    a second lap belt having an anchor end, said second lap belt having an angle from vertical of between about 0° and 32°,
    whereby a criss-cross configuration is defined by said left shoulder belt and said right shoulder belt on said back side of said seat back and a V-shaped configuration is defined by said left shoulder belt and said right shoulder belt on said front of said seat back.

4. The vehicle occupant restraint system of claim 3 wherein said angle from vertical of said first lap belt is about 16° from vertical and said angle from vertical of said second lap belt is about 16° from vertical.

5. A vehicle occupant restraint system comprising:

a seat having a seat back and a seat cushion, said seat back having a front, a top side, a left half and a right half;

a first shoulder belt having a retractor end, a buckle end and a centerline, said first shoulder belt for extending over the left shoulder of a seated occupant along said left half of said front of said seat back;

a second shoulder belt having a retractor end, a buckle end and a centerline, said second shoulder belt for extending over the right shoulder of a seated occupant along said right half of said front of said seat back;

a first shoulder belt anchor being operatively associated with said right half of said seat back, said retractor end of said first shoulder belt being connected to said first shoulder belt anchor;

a second shoulder belt anchor being operatively associated with said left half of said seat back, said retractor end of said second shoulder belt being connected to said second shoulder belt anchor; and a buckle and latch assembly to which one or both of said first shoulder belt and said second shoulder belt may be attached, said first shoulder belt and said second shoulder belt defining a V-shaped configuration when said first shoulder belt and said second shoulder belt are attached to said buckle and latch assembly, said shoulder belts having a maximum centerline-to-centerline width of between about 180 mm and about 208 mm at approximately the height of the front edge of the clavicle of a midsized male occupant.

6. The vehicle occupant restraint system of claim 5 wherein said first shoulder belt and said second shoulder belt are at least partially positioned over said top side of said seat back.

7. The vehicle occupant restraint system of claim 5 further including a first lap belt attachable to said buckle and latch assembly and a second lap belt attachable to said buckle and latch assembly and wherein said seat cushion includes a left side, a right side, and an underside and wherein said first lap belt and said second lap belt are attached to said underside of said seat cushion.

8. The vehicle occupant restraint system of claim 5 wherein said seat back further includes a back side and wherein said first shoulder belt anchor and said second shoulder belt anchor are fixed to said back side of said seat back.

9. The vehicle occupant restraint system of claim 8 wherein said first shoulder belt anchor is fixed to the right half of said back side of said seat back and wherein said second shoulder belt anchor is fixed to the left half of said back side of said seat back such that a portion of said first shoulder belt crosses over a portion of said second shoulder belt on said back side of said seat back.

10. The vehicle occupant restraint system of claim 5 further including at least one weight attached to said buckle and latch assembly.

\* \* \* \* \*